Patented July 18, 1933

1,918,371

UNITED STATES PATENT OFFICE

WALTER BERNDT AND OTTO ERNST, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PREPARATION OF METHYL CHLORIDE AND METHYLENE CHLORIDE

No Drawing. Application filed December 28, 1927, Serial No. 243,206, and in Germany January 18, 1927.

Our present invention relates to a new process of preparing halogenated organic compounds.

When exchanging in organic compounds hydrogen for halogen, hydrogen halide is obtained as a by-product. In many cases it is desirable to remove it by a chemical transformation in a useful manner.

Now we have found that the hydrogen halide can easily be removed by directly adding to the mixture of the halogenation products an alcohol, particularly methanol, and causing it to react with the hydrogen halide, with or without the application of a catalyst or pressure, so as to obtain the corresponding alkyl halide and water. Thus, by combining the halogenation and the treatment of the hydrogen halide thereby formed with an alcohol there is obtained at the final stage of the process besides some water a mixture of the halogenated starting material with an alkyl halide which can be separated or, in certain cases, directly further worked up.

Thus, for instance the hydrogen chloride, produced during the process of chlorinating methyl chloride to methylene chloride, can be directly transformed into methyl chloride by adding methanol to the mixture of the chlorination products. Owing to the low boiling point of the methyl chloride the other reaction products can be easily separated therefrom. In this particular case the methyl chloride thus obtained can immediately be subjected to the reaction with chlorine in the cycle of the process.

When applying the said process to the chlorination of methane, the amount of the methane chlorides can be increased by the quantity of methyl chloride corresponding to the quantity of hydrogen chloride contained in the chlorination products.

In other cases, for instance in the chlorination of benzene, there is obtained a mixture of the high-boiling chloro-substituted starting material with the low-boiling alkyl chloride, which mixture can easily be separated.

In every case the value of our present invention resides in the direct transformation of the disagreeable hydrogen halide formed during the halogenation into valuable products, intermediate operations being entirely avoided.

The new process is carried out by adding directly to the mixture of the halogenation products containing, besides more or less unaltered starting material, the halogen-substitution product which has formed and a quantity of hydrogen halide equivalent to the substitution product, a quantity of an aliphatic alcohol being equal molecularly to that of the hydrogen halide present. The mixture thus obtained can be caused to react in a known manner, so that the reaction of the alcohol with the hydrogen halide leading to the formation of the corresponding alkyl halide and water takes place according to the following equation:

$$ROH + HX = RX + H_2O$$

wherein R stands for an aliphatic residue and X for a halogen. The conditions of the reaction vary according to the process applied. The reaction can occur in a generally known manner, for instance in the presence of boiling, aqueous halogen hydracid at a temperature of about 100° C. or in the gaseous phase over suitable contact substances, in particular metal halides or highly-porous substances, at temperatures varying between 150° C. and 350° C. or under pressure in the presence or absence of water and a catalyst. The separation of the mixture so obtained is like-wise effected in known manner by fractional condensation, distillation, adsorption or the like.

The following examples illustrate our invention, but they are not intended to limit it thereto:

(1) A mixture of 3 parts by volume of $CH_3Cl$ and 1 part by volume of $Cl_2$ is conducted at the rate of 120 liters per hour through a reaction chamber heated ot 360° C. to 380° C. having a capacity of 750 to 800 ccm. The chlorination product leaving the chamber consists approximately of 2 parts by volume of $CH_3Cl$, 1 part by volume of $CH_2Cl_2$ and 1 part by volume of HCl. It is directly subjected in a second reaction chamber to reaction with boiling methanol whereby the methanol and hydrochloric acid are transformed into $CH_3Cl$ and $H_2O$. While the water is drawn off pari passu with its formation, a gaseous mixture of about 3 parts by volume of $CH_3Cl$ and 1 part by volume of $CH_2Cl_2$ leaves the reaction chamber. After the separation has been effected, the 3 parts by volume of $CH_3Cl$ after being mixed with 1 part by volume of $Cl_2$ are reintroduced into the chlorination process.

The said chlorination product may also be subjected to the reaction with gaseous methanol according to the indications of Example 2.

(2) A mixture of 10 parts by volume of methane and 1 part by volume of chlorine is pressed through a tube heated to 370° C. The reaction mixture consists of about 9 parts by volume of methane, 1 part by volume of methyl chloride together with small quantities of higher-chlorinated products and 1 part by volume of hydrogen chloride. To this mixture is added gaseous methanol in a quantity corresponding to the quantity of hydrogen chloride contained in the mixture and the whole is passed directly through a second reaction tube containing a catalyst heated to about 160° C. to 200° C., for instance silica-gel loaded with zinc chloride. In this tube the transformation of $CH_3OH + HCl$ to $CH_3Cl + H_2O$ is effected. The gas mixture leaving the tube now consists of about 9 parts by volume of methane, 2 parts by volume of methyl chloride together with slight quantities of higher-chlorinated products and 1 part by volume of water vapor. The separation is effected in known manner.

(3) 300 parts by weight of benzol, 1 part by weight of iron and 1 part by weight of iron chloride are placed into a closed vessel and into this mixture are first gradually pressed 156 parts by weight of chlorine. After the chlorine has been consumed 110 parts by weight of alcohol of 92 per cent. strength are introduced into the autoclave under pressure and the whole is then heated to 120° C. for 3 hours. When the reaction is complete the content of the autoclave is fractionated. In this manner there are obtained 135 parts by weight of ethyl chloride, 213 parts by weight of chlorobenzene, besides unconsumed benzol, some ortho- and para-dichlorobenzene and small quantities of 1.2.4-trichlorobenzene, aqueous hydrochloric acid and unconsumed alcohol.

In the following claims the expression "agents capable of promoting the reaction" is to be understood to comprise the use of a catalyst or pressures.

We claim:

1. The process which comprises causing vaporous methanol to act upon the reaction product obtained by the halogenation of methyl chloride and containing the hydrogen halide which has been liberated during the halogenation in the presence of a catalyst heated to 150° C. to 350° C. selected from the group of the catalysts known to promote the reaction between hydrochloric acid and methanol to form methyl-chloride and water.

2. The process which comprises causing vaporous methanol to act upon the reaction product obtained by the halogenation of methyl chloride and containing the hydrogen halide which has been liberated during the halogenation, in the presence of a catalyst heated to 160° C. to 200° C. comprising a carrier charged with zinc chloride.

3. The process which comprises passing over a catalyst heated to about 160° C. to 200° C. and comprising a carrier loaded with zinc chloride, vaporous methanol together with the gaseous reaction product obtainable by conducting a mixture of 3 parts by volume of methyl chloride and 1 part by volume of chlorine through a reaction chamber heated to 360° C. to 380° C., which reaction product contains the gaseous hydrochloric acid liberated during the process, the quantity of the vaporous methanol being equal molecularly to that of gaseous hydrochloric acid present.

4. The process which comprises causing methanol to act upon the reaction mixture obtained by the chlorination of a compound of the formula

wherein X represents hydrogen or chlorine, so as to transform the hydrogen chloride contained therein into methylchloride.

5. The process which comprises acting, in the presence of an agent known to promote the reaction between methanol and hydrogen chloride to form methylchloride and water, with methanol upon the reaction mixture obtained by the chlorination of a compound of the formula

wherein X represents hydrogen or chlorine, so as to transform the hydrogen chloride contained therein into methylchloride.

6. The process which comprises acting, in the presence of a metal halide known to promote the reaction between methanol and hydrogen chloride to form methylchloride and water, with methanol upon the reaction mixture obtained by the chlorination of a compound of the formula

wherein X represents hydrogen or chlorine, so as to transform the hydrogen chloride contained therein into methylchloride.

7. The process which comprises acting, in the presence of highly-porous substances known to promote the reaction between methanol and hydrogen chloride to form methylchloride and water, with methanol upon the reaction mixture obtained by the chlorination of a compound of the formula

wherein X represents hydrogen or chlorine, so as to transform the hydrogen chloride contained therein into methylchloride.

8. The process which comprises acting, in the presence of a carrier charged with zinc chloride, upon the reaction mixture obtained by the chlorination of a compound of the formula

wherein X represents hydrogen or chlorine, so as to transform the hydrogen chloride contained therein into methylchloride.

9. The process which comprises causing vaporous methanol to act upon the reaction mixture obtained by the chlorination of a compound of the formula

wherein X represents hydrogen or chlorine, so as to transform the hydrogen chloride contained therein into methylchloride.

10. The process which comprises acting, in the presence of an agent known to promote the reaction between methanol and hydrogen chloride to form methylchloride and water, with vaporous methanol upon the reaction mixture obtained by the chlorination of a compound of the formula

wherein X represents hydrogen or chlorine, so as to transform the hydrogen chloride contained therein into methylchloride.

11. The process which comprises acting with methanol upon the reaction mixture obtained by the chlorination of methychloride, so as to transform the hydrogen chloride contained therein into methylchloride.

12. The process which comprises acting with methanol upon the reaction mixture obtained by the chlorination of methylchloride, so as to transform the hydrogen chloride contained therein into methylchloride, and reintroducing the methylchloride thus formed into the chlorination process.

13. The process which comprises acting, in the presence of an agent known to promote the reaction between methanol and hydrogen chloride to form methylchloride and water, with methanol upon the reaction mixture obtained by the chlorination of methylchloride, so as to transform the hydrogen chloride contained therein into methylchloride, and reintroducing the methylchloride thus formed into the chlorination process.

14. The process which comprises acting with vaporous methanol upon the reaction mixture obtained by the chlorination of methylchloride, so as to transform the hydrogen chloride contained therein into methylchloride.

15. The process which comprises acting, in the presence of an agent known to promote the reaction between methanol and hydrogen chloride to form methylchloride and water, with vaporous methanol upon the reaction mixture obtained by the chlorination of methylchloride, so as to transform the hydrogen chloride contained therein into methylchloride.

16. The process which comprises acting with methanol upon the reaction mixture obtained by the chlorination of methane, so as to transform the hydrogen chloride contained therein into methylchloride.

17. The process which comprises acting with vaporous methanol upon the reaction mixture obtained by the chlorination of methane, so as to transform the hydrogen chloride contained therein into methylchloride.

18. The process which comprises acting in the presence of an agent known to promote the reaction between methanol and hydrogen chloride to form methylchloride and water with vaporous methanol upon the reaction mixture obtained by the chlorination of methane, so as to transform the hydrogen chloride contained therein into methylchloride.

WALTER BERNDT.
OTTO ERNST.